(12) United States Patent
Francois et al.

(10) Patent No.: US 11,624,479 B2
(45) Date of Patent: Apr. 11, 2023

(54) METHOD FOR MEASURING THE QUANTITY OF GAS INTRODUCED INTO A RESERVOIR AND FILLING STATION

(71) Applicant: L'Air Liquide, Societe Anonyme pour l'Etude et l'Exploitation des Procedes Georges Claude, Paris (FR)

(72) Inventors: Thibaut Francois, Fontanil Cornillon (FR); Marcus Buck, Wiesbaden (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 212 days.

(21) Appl. No.: 16/603,488

(22) PCT Filed: Mar. 29, 2018

(86) PCT No.: PCT/FR2018/050771
§ 371 (c)(1),
(2) Date: Oct. 7, 2019

(87) PCT Pub. No.: WO2018/185403
PCT Pub. Date: Oct. 11, 2018

(65) Prior Publication Data
US 2021/0293385 A1 Sep. 23, 2021

(30) Foreign Application Priority Data
Apr. 7, 2017 (FR) ....................... 1753047

(51) Int. Cl.
*F17C 13/02* (2006.01)
*F17C 5/00* (2006.01)
*G01F 15/04* (2006.01)

(52) U.S. Cl.
CPC ............ *F17C 13/028* (2013.01); *F17C 5/007* (2013.01); *G01F 15/046* (2013.01);
(Continued)

(58) Field of Classification Search
CPC ................... F17C 13/02; F17C 13/028; F17C 2203/0673; F17C 2205/0323;
(Continued)

(56) References Cited

U.S. PATENT DOCUMENTS 7,621,302 B2 * 11/2009 Shock ....................... F17C 5/06
141/104
2006/0180236 A1 * 8/2006 Hoke, Jr. ................. F17C 5/06
141/94

(Continued)

FOREIGN PATENT DOCUMENTS

EP    3 607 279     2/2020
JP    2004-257525   9/2004

(Continued)

OTHER PUBLICATIONS

JP2007024152A—English Translation (Year: 2007).*
(Continued)

*Primary Examiner* — Timothy P. Kelly
*Assistant Examiner* — Christopher M Afful
(74) *Attorney, Agent, or Firm* — Christopher J. Cronin; Elwood L. Haynes

(57) ABSTRACT

A quantity of gas is introduced into a gas reservoir via a filling station provided with a filling line. The quantity is measured. A signal is generated indicating a corrected quantity of transferred gas. The signal is obtained by adding a predetermined, positive or negative, corrective amount to the measured quantity of gas transferred.

13 Claims, 1 Drawing Sheet

(52) U.S. Cl.
CPC ............ *F17C 2205/0323* (2013.01); *F17C 2205/0352* (2013.01); *F17C 2221/012* (2013.01); *F17C 2223/0123* (2013.01); *F17C 2223/036* (2013.01); *F17C 2225/0123* (2013.01); *F17C 2225/033* (2013.01); *F17C 2227/0337* (2013.01); *F17C 2227/044* (2013.01); *F17C 2250/032* (2013.01); *F17C 2250/034* (2013.01); *F17C 2250/043* (2013.01); *F17C 2250/0439* (2013.01); *F17C 2250/0443* (2013.01); *F17C 2265/065* (2013.01); *F17C 2270/0139* (2013.01)

(58) Field of Classification Search
CPC ........ F17C 2205/0352; F17C 2221/012; F17C 2223/0123; F17C 2223/0161; F17C 2223/033; F17C 2223/035; F17C 2223/036; F17C 2227/0337; F17C 2227/04; F17C 2227/044; F17C 2250/032; F17C 2250/034; F17C 2250/043; F17C 2250/0439; F17C 2250/0443; F17C 2250/0636; F17C 2260/024; F17C 2260/026; F17C 2265/065; F17C 2270/0139; F17C 2270/0168; F17C 5/007; F17C 5/06; G01F 13/00; G01F 13/006; G01F 15/00; G01F 15/002; G01F 15/003; G01F 15/02; G01F 15/046; Y02E 60/32

USPC .......................................................... 141/11
See application file for complete search history.

(56) References Cited

U.S. PATENT DOCUMENTS

| | | |
|---|---|---|
| 2009/0084194 A1 | 4/2009 | Shock et al. |
| 2014/0196814 A1 | 7/2014 | Nagura et al. |
| 2021/0293385 A1 | 9/2021 | Francois et al. |

FOREIGN PATENT DOCUMENTS

| | | | |
|---|---|---|---|
| JP | 2007 024152 | | 2/2007 |
| JP | 2007024152 A | * | 2/2007 |
| JP | 2014 043882 | | 3/2014 |
| JP | 2014043882 A | * | 3/2014 |

OTHER PUBLICATIONS

JP2014043882A—English Translation (Year: 2014).*
"Using the HART® Communicator with Micro Motion 9700 Series Transmitters", 1994 (Year: 1994).*
International Search Report and Written Opinion for PCT/FR2018/050771, dated Jun. 29, 2018.
French Search Report and Written Opinion for FR 1753047, dated Mar. 1, 2018.

* cited by examiner

METHOD FOR MEASURING THE QUANTITY OF GAS INTRODUCED INTO A RESERVOIR AND FILLING STATION

CROSS-REFERENCE TO RELATED APPLICATIONS

This application is a § 371 of International PCT Application PCT/FR2018/050771, filed Mar. 29, 2018, which claims § 119(a) foreign priority to French patent application FR 1753047, filed Apr. 7, 2017.

BACKGROUND

Field of the Invention

The invention relates to a method for measuring the quantity of gas introduced into a tank, and to a filling station.

The invention relates more particularly to a method for measuring the quantity of gas introduced into a gas tank via a filling station provided with a filling pipe comprising an upstream end connected to at least one source of pressurized gas and a downstream end connected to a tank that is to be filled, the filling pipe comprising a flow meter and a downstream isolation valve positioned between the flow meter and the downstream end of the filling pipe, the method comprising a step of transferring gas from the source to the tank, during which step the downstream isolation valve is open, a step of interrupting the transfer of gas with closure of the downstream valve, the method comprising a step of measuring, using the flow meter, the quantity of gas transferred during the transfer step.

Related Art

Filling stations for filling pressurized-gas tanks, notably the fuel-gas tanks of vehicles, need to measure the quantity of gas introduced into the tank, to be measured with a relatively high level of precision. This is particularly true of the filling of hydrogen-gas tanks.

This quantity needs to be measured so that a charge can be made for it (in the same way as a liquid fuel).

In the case of a gas, for example hydrogen, there are a great many parameters that influence the measurement of this quantity (pressure, temperature, volume, flow rate . . . ).

This quantity is dependent in particular on the initial conditions (notably the pressure prior to filling) and the final conditions (notably the pressure after filling).

This quantity is also difficult to measure because in general a quantity of gas present in the circuit is purged to the outside after filling. The purpose of this purge is to lower the pressure in the hose of the filling pipe in order to allow the user to disconnect the end of the filling pipe from the tank.

Ideally, the flow rate of gas transferred should be measured as close as possible to the tank (at the filling nozzle). However, for industrial and technical reasons, this flow rate measurement is in fact performed further upstream. Thus, some of the gas measured by the flow meter is not transferred into the tank and there is a risk that a charge will be made for it.

In order to estimate, as correctly as possible, the quantity of gas transferred (and therefore chargeable) certain known methods do not count the gas injected during the pre-filling test (pulses of gas are used for leak testing and/or for calculating the volume of the tank or other parameters).

SUMMARY OF THE INVENTION

It is an object of the invention to propose a method and/or a device that makes it possible to improve the precision with which this quantity of gas actually supplied to the tank is measured.

It is an object of the present invention to alleviate all or some of the above-mentioned disadvantages of the prior art.

To this end, the method according to the invention, in other respects in accordance with the generic definition thereof given in the above preamble, is essentially characterized in that it comprises a step of generating a signal indicating the corrected quantity of gas transferred, the corrected quantity of gas transferred being obtained by adding a positive or negative determined corrective quantity to the transferred quantity of gas measured by the flow meter during the transfer step.

Moreover, embodiments of the invention may comprise one or more of the following features:

- the determined corrective quantity is the difference between, on the one hand, the measured or calculated quantity of gas situated downstream of the flow meter in the filling pipe prior to the transfer step and, on the other hand, the measured or calculated quantity of gas situated in the filling pipe downstream of the flow meter during and/or at the end of the transfer step,
- the quantity of gas situated downstream of the flow meter in the filling pipe is calculated via a predetermined state equation applied to the gas, such as the perfect-gas or real-gas equation, and from the known volume of the filling pipe downstream of the flow meter, from the pressure measured in the filling pipe downstream of the flow meter, from the known nature of said gas and notably its molar mass or its density, and from the measured or estimated temperature of the gas,
- the volume of the filling pipe downstream of the flow meter is the sum of a first known volume of the filling pipe situated between the flow meter and the downstream isolation valve and of a second known volume of the filling pipe situated between the downstream isolation valve and the downstream end of the filling pipe, the quantity of gas situated downstream of the flow meter in the filling pipe before or during/after the transfer step being calculated as the sum of the quantities of gas in, respectively, the first and second volumes, the quantities of gas in the first and second volumes being calculated V=VA+VB via a predetermined state equation such as the perfect-gas or real-gas equation, applied to the first and to the second volumes respectively, from the pressures measured in the filling pipe and in said volumes respectively, from the known nature of said gas and notably its molar mass or its density, and from the measured or estimated temperature of the gas in said volumes respectively,
- the measured or calculated quantity of gas situated downstream of the flow meter in the filling pipe before the transfer step is determined while the downstream isolation valve is closed and while the first volume is at the pressure of the pressurized-gas source, namely while the first volume is in fluidic communication with the source (5) of pressurized gas,
- the filling pipe comprises a heat exchanger for cooling the gas situated between the flow meter and the downstream isolation valve, the first volume consisting of a first portion situated between the flow meter and the inlet of the heat exchanger and a second portion situated between the heat exchanger and the downstream isolation valve, and in that the quantity of gas in the first volume is calculated as being the sum of the quantities of gas in said portions the volumes of which are known and in which the respective pressures or temperatures of the gas are measured or estimated separately, the quantity of gas situated downstream of the flow meter in the filling pipe before the transfer step is measured or calculated while the downstream isolation valve is closed and while the first volume is at the pressure of the tank that is to be filled, namely while the second volume is in fluidic communication with the tank, the filling pipe comprises, downstream of the downstream isolation valve, a controlled purge valve configured to allow the purging of the filling pipe, and in that the measured or calculated quantities of gas downstream of the flow meter in the filling pipe before and after the transfer step are determined while the purge valve is closed and prior to a purge step, if any, that consists in opening the purge valve after the transfer step, the pressure measured in the filling pipe downstream of the flow meter is measured when the purge valve is closed, the step of generating a signal indicative of the corrected quantity of gas transferred is performed during the transfer step, notably in real-time, or in a way that is temporally uniformly distributed through the transfer step and/or at the end or after the end of the transfer step, the flow meter is of the type that generates electric signals in the form of successive pulses each corresponding to an elementary measured quantity of gas, the generation of a signal indicating the corrected quantity of gas transferred being obtained by a step of modifying at least one of the following: the value of the elementary quantity of gas corresponding to a pulse generated by the flow meter and/or the number of pulses generated by the flow meter and/or the frequency with which the pulses generated by the flow meter are emitted and/or the number of pulses counted from the pulses generated by the flow meter, the filling station comprises an electronic data processing and storage device, notably comprising a microprocessor and/or a computer, said electronic device being configured to receive a signal indicative of the quantity of gas transferred as measured by the flow meter during the transfer step and to calculate and/or receive and/or transmit and/or display the signal indicating the corrected quantity of gas transferred, the signal indicating the corrected quantity of gas transferred is used in a step of calculating a charge to be made for the quantity of gas introduced into the tank, The generation of a signal indicative of the corrected quantity of gas transferred is obtained by subtracting, or by adding, a determined quantity of pulses from or to the pulses generated by the flow meter, the modification step is performed by modifying (up or down) the frequency of the pulses generated by the flow meter, namely by removing or by adding a determined length of time into the time interval between at least two pulses generated by the flow meter in the event that the corrected quantity of gas transferred consists in reducing, by a determined corrective quantity, the quantity of gas transferred as measured by the flow meter during the transfer step, this reduction is performed by eliminating and/or by not counting certain determined pulses from among the pulses generated by the flow meter.

The invention also relates to a filling station for filling tanks with pressurized fluid, notably for filling tanks with pressurized hydrogen, comprising a filling pipe comprising an upstream end connected to at least one source of pressurized gas and at least one downstream end intended to be connected to a tank that is to be filled, the filling pipe comprising a flow meter and at least one downstream isolation valve positioned between the flow meter and the downstream end of the filling pipe, the at least one valve being operated in such a way as to allow a step of transferring gas from the source to the tank, the flow meter being configured to measure the quantity of gas transferred and to generate a corresponding signal, the station comprising an electronic data processing and storage device, notably comprising a microprocessor and/or a computer, the electronic device being configured to receive the signal from the flow meter and to generate a signal indicative of the corrected quantity of gas transferred, the corrected quantity of gas transferred being obtained by adding a positive or negative determined corrective quantity to the transferred quantity of gas measured by the flow meter during the transfer step.

The invention may also relate to any alternative device or method comprising any combination of the features above or below.

BRIEF DESCRIPTION OF THE FIGURES

Further particular features and advantages will become apparent from reading the following description, given with reference to the figures, in which.

Figure 1:
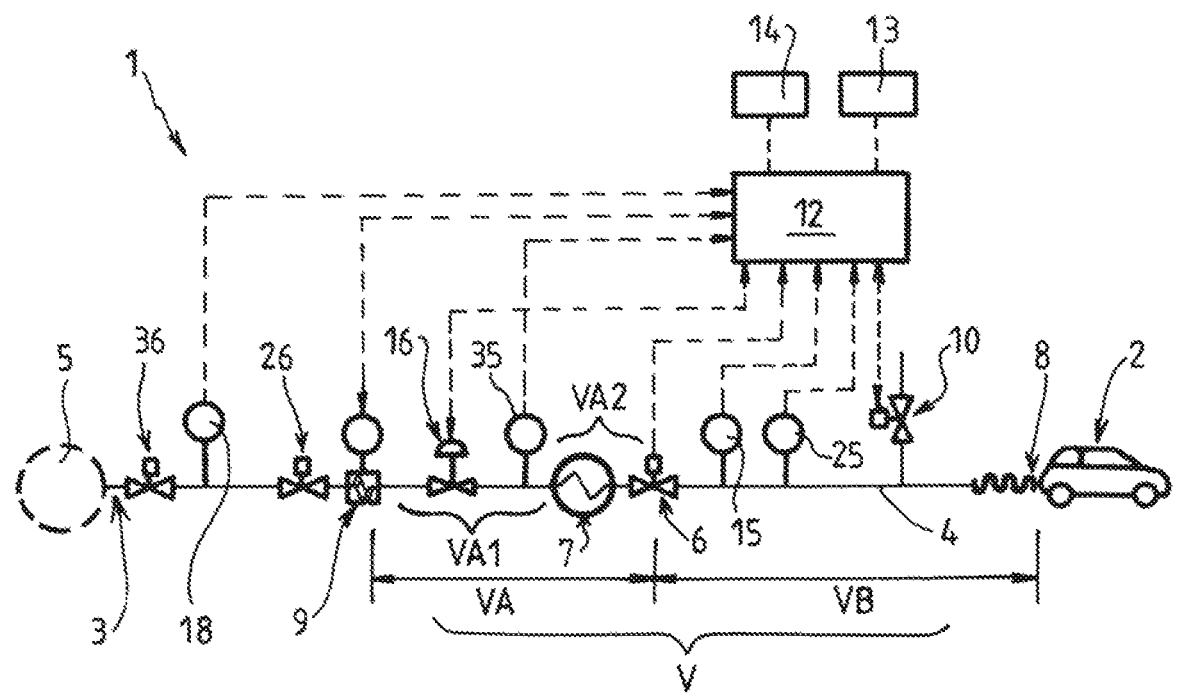
FIG. 1 is a schematic and partial view illustrating one example of a structure and operation of a filling station according to one possible exemplary embodiment of the invention.

The filling station 1 for filling tanks with pressurized fluid as schematically indicated in FIG. 1 conventionally comprises a filling pipe 4 comprising at least one upstream end 3 connected to at least one source 5 of pressurized gas and at least one downstream end 8 intended to be connected to a tank 2 that is to be filled.

The source 5 of gas (notably hydrogen) may comprise at least one of the following: one or more tanks of pressurized gas, notably several tanks connected in parallel for cascade filling, a compressor, a source of liquefied gas and a vaporizer, and/or any other appropriate source of pressurized gas.

The downstream end 8 comprises for example at least one flexible hose, the terminal end of which comprises a coupling, preferably a quick coupling, allowing it to be connected in a sealed manner to the inlet of a tank 2 or of a filling circuit for filling a tank 2 (notably of a vehicle).

The filling pipe 4 comprising a flow meter 9 and at least one downstream isolation valve 6 positioned between the flow meter 9 and the downstream end 8 of the filling pipe 4. The isolation valve 6 is preferably an operated valve 6 controlled in such a way as to allow a step of transferring gas from the source 5 to the tank 2 when this valve is open.

The flow meter 9 is preferably of the Coriolis-effect type and is configured to measure the transferred quantity of gas and to generate a corresponding (preferably electrical) signal.

The station 1 comprises an electronic data processing and storage device 12, comprising for example a microprocessor and/or a computer. This electronic device 12 is configured to receive the signal from the flow meter 9 and to generate a signal indicating the corrected quantity of gas transferred which is obtained by reducing or increasing, by a determined corrective quantity, the measured quantity of gas transferred, as measured by the flow meter 9 during transfer.

For preference, the electronic device 12 can be configured to control all or some of the valves 6, 10 or components of the station and/or to receive all or some of the pressure and/or temperature measurements taken by one or more sensor(s) 15, 35, 25 in the filling circuit 4 (upstream and/or downstream of the downstream isolation valve 6. In particular, the electronic device 12 may preferably be configured to control the transfer of gas to the tank 2 (control of the flow rate and/or the sources . . . ) according to a predetermined flow rate (fixed and/or variable pressure gradient). In particular, the station 1 may comprise an upstream valve 36 (preferably operated) situated downstream of the source(s) 5.

Likewise, the station 1 may comprise a second valve 26 situated between the upstream valve 36 and the flow meter 9.

In addition, the electronic device 12 may comprise or be associated with a man-machine interface comprising, for example, a display 13 and/or a payment terminal 14 and/or an input and/or identification member. The electronic device 12 may comprise wireless communication members for transmitting or receiving these data and/or other data. In particular, all or part of the data storage and/or computing and/or display and/or invoicing means may be sited away from the station or duplicates sited remotely (via the Internet or a local network and using, for example, mobile telephone applications).

As illustrated, the filling pipe 4 also preferably further comprises a purge valve 10 situated downstream of the downstream isolation valve 6.

The purge valve 10 is preferably controlled in such a way as to discharge to outside the filling pipe 4 at least some of the pressurized gas trapped in the downstream part of the filling pipe 4 after a transfer step (at the end of a filling operation). The purged gas is discharged into the atmosphere or into a recovery zone.

The station 1 is configured (for example programmed or operated) in such a way as to perform filling operations comprising a step of transferring gas from the source 5 to the tank 2 during which step the downstream isolation valve 6 is open, and a step of interrupting the transfer of gas, with closure of the downstream valve 6.

The station is configured to measure, via the flow meter 9, the quantity of gas transferred during the transfer step.

Figure 2:
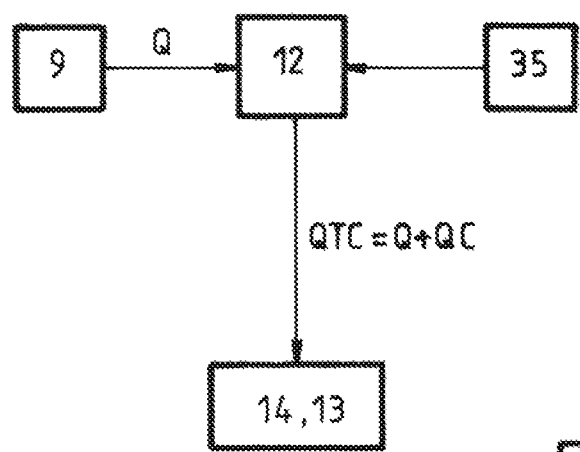
FIG. 2 is a schematic and partial view illustrating the principle behind the generation of a signal indicating the corrected quantity of gas transferred.

According to one advantageous particular feature, the station 1 generates a signal indicating the corrected quantity QTC of gas transferred (cf FIG. 2), this corrected quantity QTC of gas transferred being obtained by adding a positive or negative determined corrective quantity QC to the measured quantity Q of gas transferred, as measured by the flow meter 9 during the transfer step (cf FIG. 2).

By reducing or increasing, by a corrective quantity QC, the measured quantity Q of gas transferred as measured by the flow meter 9 during the transfer step it is thus possible to display and/or to invoice the user a quantity QTC of gas which is closer or equal to the quantity of gas actually transferred into the tank 2.

Advantageously, by measuring or calculating the quantity of gas present in the filling pipe 4 downstream of the flow meter 9 before the transfer step and after or during the transfer step and by calculating the difference between these values, it is possible to estimate more correctly the quantity of gas actually transferred into the tank.

The determined corrective quantity may, in particular, be the difference between, on the one hand, the measured or calculated quantity of gas situated downstream of the flow meter 9 in the filling pipe 4 prior to the transfer step and, on the other hand, the measured or calculated quantity of gas situated in the filling pipe 4 downstream of the flow meter 9 during and/or at the end of the transfer step.

Specifically, before a transfer of gas to the tank 2, there may already be a not-insignificant quantity of gas trapped under pressure between the flow meter 9 and the downstream isolation valve 6. Before filling, downstream of the downstream isolation valve 6, the filling pipe 4 has theoretically been purged (in order to allow disconnection from the previous tank and allow connection to the tank 2 that is to be filled). This initial quantity of gas downstream of the isolation valve 6 may be a determined quantity that is fixed or measured or estimated and/or may potentially be negligible.

During or at the end of the filling step, a quantity of gas is trapped between the flow meter 9 and the downstream isolation valve 6, and also downstream of this downstream isolation valve 6.

The corrective quantity is preferably the difference between the quantity of gas which "was there before the transfer step" and the quantity of gas "which is there" during or at the end of the transfer step.

This makes it possible in particular to take account of any jets of gas that may be used during a preliminary phase preceding the actual filling (for leak tests and/or for other calculations such as for calculating the volume of the tank 2 that is to be filled).

The quantity of gas situated downstream of the flow meter 9 in the filling pipe 4 can be calculated via a predetermined state equation applied to the gas, such as the perfect-gas or real-gas equation, and from the known volume V of the filling pipe 4 downstream of the flow meter 9, from the pressure measured 15 in the filling pipe 4 downstream of the flow meter 9, from the known nature of said gas (for example hydrogen) and notably its molar mass or its density, and from the measured or estimated temperature 25 of the gas.

Specifically, the quantity (for example mass) of gas is dependent on the volume and on the density thereof. The density is dependent on its pressure and its temperature. Temperature variations have little influence on the calculated quantities. The inventors have determined that pressure is the parameter of greatest significance in determining the density of the gas.

As illustrated, this volume V of the filling pipe 4 downstream of the flow meter 9 may be the sum of a first known volume VA situated between the flow meter 9 and the downstream isolation valve 6 and of a second known volume VB situated between the downstream isolation valve 6 and the downstream end 8 of the filling pipe 4.

The quantity (for example mass) of gas situated downstream of the flow meter 9 in the filling pipe 4 before (or during and/or after) the transfer step can be calculated as the sum of the quantities of gas in the first VA and second VB volumes respectively. The quantities of gas in the first VA and second VB volumes can be calculated (V=VA+VB) via a state equation such as the perfect-gas equation or the real-gas equation, applied to the first VA and the second VB volumes respectively, from the measured 35, 15 pressures in the filling pipe 4 in said volumes VA, VB respectively, from the known nature of said gas and notably the molar mass thereof, and from the gas temperature measured 25 or estimated in said volumes VA, VB, respectively.

As illustrated, the filling pipe 4 may comprise a heat exchanger 7 cooling the gas situated between the flow meter 9 and the downstream isolation valve 6.

Thus, the first volume VA may be made up of a first portion VA1 situated between the flow meter 9 and the inlet of the heat exchanger 7, and a second portion situated between the heat exchanger 7 and the downstream isolation valve 6.

Thus, the quantity of gas in the first volume VA may be calculated as being the sum of the quantities of gas in said portions VA1, VA2 the volumes of which are known and in which the respective pressures or temperatures of the gas are measured 15, 25, 35 or estimated or predetermined separately.

The station 1 may for that purpose comprise all or some of:
- a pressure sensor 18 situated between the upstream valve 36 and the second valve 26,
- a pressure (and/or temperature) sensor 35 situated between the flow meter 9 and the downstream isolation valve 6,
- a pressure sensor 15 situated downstream of the downstream isolation valve 6,
- a temperature sensor 25 situated downstream of the downstream isolation valve 6.

For example, the gas in the first portion VA1 may be considered to be at ambient temperature or a fixed predetermined temperature (for example 15° C.).

For example, the gas in the second portion VA2 may be considered to be at the temperature measured in the exchanger 7 or a fixed predetermined temperature, for example the temperature imposed on the gas by the exchanger (for example −38° C.).

The quantity of gas in each volume VA1, VA2 may in each case be obtained by multiplying the density (namely the mass per unit volume) by the volume. The density may be given by known gas tables, according to the temperature or the pressure of the gas. For example, the variation in density as a function of the variation in temperature may be expressed by a third-degree polynomial in which the variable is the temperature, for example: density (at the temperature x)=a $x^3$+b$x^2$+cx+d where x=the temperature and a=1.45796488E-08, b=4.67566286E-05, c=8.27775648E-02 and d=1.26788978E-01 for a gas temperature of 15° C.

For a gas temperature of −38° C. the coefficients may be a=0.00000002, b=0.00006715, c=0.10133084 and d=0.20007587.

Of course, any other way of determining the density may be envisioned (for example, tables pre-recorded in the device 12 as a function of temperature, value that is fixed for a predetermined temperature, etc.).

Note that the gas-quantity calculations are preferably performed for a reference temperature (for example equal to 15° C. in the first portion of the first volume). If an increase in temperature occurs (for example 40° C. rather than 15° C.) this has little influence on the results (but this could be compensated for by calculation if a high level of precision is required).

Specifically, the inventors have determined that this alters the calculated quantity of gas in the first portion of the first volume V1 by only a few percent (less than three percent). Thus, measuring or taking account of a precise ambient temperature has little influence over the precision of the method.

Likewise, in the event of insufficient cooling of the exchanger 7, even if the temperature of the cooled gas in the second portion of the first volume is not that taken into consideration (for example if it is −33° C. rather than −38° C.), this likewise has little impact on the precision of the results.

Likewise, if the measured pressures in the volumes VA1, VA2, VB are erroneous (out by 20 bar for example), this too has little influence and can be neglected (but this could be compensated for by calculation if a higher level of precision is required).

This indicates that the calculation of the corrective quantity is fairly robust in terms of potential fluctuations in the operating conditions or measurement conditions.

In instances in which the volumes V1, V2, VB are estimated imprecisely, this has a greater, but limited, impact on the estimates. Specifically, an error of around 10% in volume has a less than 10% effect on the admitted error margin.

Of course, any other suitable way of calculating, estimating or approximating the density may be employed.

EXAMPLE 1

Let there be a first volume VA of 400 $cm^3$ and a second volume VB of 180 $cm^3$. If the initial pressure (for example measured before the transfer step) is 850 bar in the first volume VA and 4 bar in the second volume VB, the respective quantities of hydrogen gas in these volumes are 20.5 g and 0.1 g. The total initial quantity of gas downstream of the flow meter 9 is therefore 20.6 g.

These quantities have been calculated for a predefined or measured or estimated gas temperature considered (for example 15° C. for VA1=66 $cm^3$ approx, −38° C. for VA2=336 $cm^3$ approx, and V=177 $cm^3$ approx).

During (or at the end of) the filling step, the pressure in the first volume VA may reach 750 bar and in the second volume VB may reach 750 bar (the downstream isolation valve has been opened to equalize the pressures in the upstream and downstream parts of the filling pipe 4). In this case, the quantities of hydrogen gas in these two volumes VA, VB are therefore 19 g and 8.5 g, respectively. The total initial quantity of gas downstream of the flow meter 9 is therefore 27.5 g. Thus, if filling stops there, the corrective quantity is −6.9 g, which means to say that 6.9 g of gas needs to be subtracted from the quantity measured by the flow meter 9 during the transfer with respect to the initial state.

Thus, the corrective quantity (the absolute value and the sign: positive or negative, thereof) depends on the pressure conditions before and during (after) the transfer of gas.

EXAMPLE 2

In this second example, the initial volumes and quantities are identical to the first example (VA=400 cm VB=80 $cm^3$; respective pressures/quantities 850 bar/20.5 g and 4 bar/0.1 g).

During (or at the end of) the filling step, the pressure may this time reach 400 bar in the first volume VA, and 400 bar in the second volume VB.

In this case, the quantities of hydrogen gas in these two volumes VA, VB are therefore 12.4 g and 5.6 g, respectively. The total final quantity of gas downstream of the flow meter 9 is therefore 18 g. Thus, if filling stops there, the corrective quantity is 20.6−18=2.6 g, which means to say that 2.6 g of gas needs to be added to the quantity measured by the flow meter 9 during the transfer.

Specifically, the conditions before the transfer of gas make it possible to calculate the quantity of gas present in the relevant portion of the filling pipe. Then, as the transfer of gas takes place, the pressure in the filling pipe 4 will change. The quantity of gas present in this pipe 4 will therefore evolve. Likewise, this difference will vary (positive value or zero or negative value). According to one advantageous particular feature, this difference is calculated continuously (for example in real-time). What this means to say is that the actual quantity of gas transferred into the tank (quantity measured by the flow meter plus the corrective quantity) can be calculated continuously or regularly during the course of filling (so that it can be displayed or stored in a memory or transmitted remotely). Thus, the quantity actually transferred into the tank 2 can be calculated in real-time. Thus, if the user stops filling prematurely, the quantity actually consumed/chargeable will be available and will, where appropriate, have already been displayed without the need for post facto correction.

What that means to say is that the correction (corrective quantity) is updated during the course of filling and added during the course of filling to the value measured by the flow meter.

For preference, this correction is taken into consideration only if there is a significant difference (for example to within 0.5 g of gas). What that means to say is that if the determined corrective quantity represents less than 0.5 g of gas in terms of absolute value, this corrective quantity is not adopted.

For preference also, in the event of a deviation in the calculated corrective quantity, this deviation or uncertainty is applied in the user's favor (the user may where appropriate be charged for a corrected quantity of gas that is slightly lower than the quantity actually transferred to the tank 2).

The start of filling may preferably be detected using the information indicating closure of the purge valve 10. What this means to say is that after the purge following a previous filling operation, the closure of this purge valve 10 may constitute the or one of the conditions signalling the moment at which the initial conditions (pressure etc.) need to be determined in order to calculate the quantity of gas downstream of the flow meter 9 before a transfer step.

With reference to the figure, one example of the filling process may comprise all or some of the successive steps below.

At a time T0, the user may identify himself to the man-machine interface 13, 14 of the station (using a payment card or the like for example). If he is positively identified, he is invited to connect the downstream end 8 of the filling pipe 4 to the tank 2 that is to be filled.

At the time T1, upon this connection, the electronic device 12 may exchange with the payment and/or invoicing terminal 14. If the filling is authorized, the electronic device 12 may command the opening of the downstream isolation valve 6 (and possibly of all or some of the upstream valves 16, 26, 36) in order to place the filling pipe 4 at the pressure of the source 5.

At the time T2, after connection, the user (or the station itself) may initiate the filling (by the pressing of a button for example). It is at (or before) this moment that the purge valve 10 may be closed. This may initiate the process of calculating the determined corrective quantity.

Thus, the initial quantity of gas downstream of the flow meter can be calculated at this instant (see the above examples), notably in the first volume A.

A regulating valve 16 (situated upstream of the downstream isolation valve 6) may be opened for jets of gas ("pulses"). Gas may then flow thus via the flow meter 9. For preference, this or these jets of gas are not subsequently counted in the quantity of gas actually transferred to the tank 2.

At the time T3, the downstream isolation valve 6 can be closed again. The pressure measured 35 between the regulating valve 16 and the downstream isolation valve 6 may drop to equalize with the pressure of the tank 2. This drop in pressure indicates a negative calculated corrective quantity (there is in effect a drop in pressure downstream of the flow meter 9 by comparison with the initial conditions). The corrected quantity of gas can be transmitted in real time to the invoicing device 14.

At the time T4 the actual filling (the transfer of gas according to a determined gradient for example) may be activated by control of the appropriate valves 6, 16. The pressure measured by the sensor 35 downstream of the downstream isolation valve 6 (notably downstream of the control valve 16) measures a pressure which increases. The flow meter 9 measures this flow.

The quantity of gas downstream of the flow meter 9 in the filling pipe 4 will therefore increase. This quantity in the volume $V=VA+VB$ is calculated for each determined pressure increment or each determined time increment or continuously (see above). The measured quantity of gas as measured by the flow meter 9 may be greater than the quantity of gas actually transferred into the tank 2, which means to say that the calculated corrective quantity of gas may be negative.

At the time T5, when the filling step is interrupted (automatically or by the user), the downstream isolation valve 6 is closed and then the purge valve 10 is opened.

The electronic device 12 has continually updated the corrected quantity QTC of gas transferred (or has done so at the end of the transfer, although that scenario is less ergonomic). The (corrected) quantity actually transferred into the tank 2 is displayed/chargeable 12, 14 and may differ (be greater or less than) from the quantity of gas measured by the flow meter 9.

Another filling operation may succeed this finished filling operation.

For preference, the flow meter 9 is of the type that generates electrical signals in the form of successive pulses each one corresponding to a measured elementary quantity of gas (for example one gram or three grams or "x" grams per pulse). What that means to say is that each time the flow meter 9 measures the passage of a quantity (for example one gram) of gas, it emits a pulse. The measured flow rate Q corresponds to the number of pulses per unit of time (for example a certain number of grams of gas per minute).

The generation of a signal indicating the corrected quantity (QTC) of gas transferred may be obtained by a step of modifying at least one of the following: the value of the elementary quantity of gas corresponding to a pulse generated by the flow meter 9 and/or the number of pulses generated by the flow meter 9 and/or the frequency with which the pulses generated by the flow meter 9 are emitted and/or the number of pulses counted from the pulses generated by the flow meter 9.

The generation of a signal indicative of the corrected quantity of gas transferred may notably be obtained by subtracting, or by adding, a determined quantity of pulses from or to the pulses generated by the flow meter 9. The subtracting of pulses may be achieved for example by not taking certain pulses into consideration (by not counting them).

This adjusting of the pulses may be performed continuously in each predetermined-time time interval (second), and/or for each predetermined pressure interval (bar) in the tank and/or each predetermined quantity of pulses, or in real-time.

Thus, the corrective quantity of gas may be known at each pressure level during the filling. For each gram of gas measured by the flow meter 9, a calculated fraction may be considered not to have been introduced into the tank 2 and subsequently purged.

Instead of removing (not counting)/adding pulses from/to those measured by the flow meter 9, it is also possible to alter another parameter such as the phase or frequency modulation of the pulses. Thus, the interval of time between the pulses may act as an adjustment variable in order to arrive at the corrected quantity of gas.

Thus, it is possible to "reconstruct/modify" the frequency of the pulses generated by the flow meter 9 in order to take this correction into account.

For example, if one hundred pulses are generated by the flow meter 9 in a time D, these are reprocessed (by signal processing) into ninety pulses uniformly distributed over the same time D.

The time added or subtracted between two pulses can be determined so that it corresponds to the corrected quantity of gas.

The filling time D may be defined/estimated beforehand (before filling) according to the initial pressure in the tank 2, to the intended rate of pressure rise (predefined pressure gradient) and to the desired final pressure.

For example, for a 122-liter tank, and a pressure gradient of 218 bar/minute, and a target pressure of 819 bar, the filling time D is 3 minutes and 15 seconds (injected quantity is 4.2 kg, and the filling temperature is −33° C.). These filling conditions are defined, as appropriate, by standardized conditions.

To simplify the process, all or some of the parameters (filling time D, quantity of gas transferred, ambient temperature, temperature of the gas in the filling pipe 4, pressure in the filling pipe 4 before the transfer step, final temperature in the filling pipe 4 the end of the transfer step . . . ) may be fixed beforehand according to conditions deemed to be standard.

The corrected quantity of gas transferred would then be calculated on the basis of these fixed conditions. This notably makes it possible to limit the number of parameters that need to be measured and therefore the number of devices the operation of which needs to be certified.

Likewise, in another possible embodiment, the value of the individual quantity of the pulses may serve as an adjustment variable for arriving at the corrected quantity of gas.

For example, the pulses are no longer generated for each gram but for each 1.1 gram of gas measured or 0.9 gram, or other values in order to take account of the corrective quantity of gas.

The electronic data processing and storage device 12 may comprise or be associated with a pulse counting member and a member for correcting the counted pulses (this or these member(s) may comprise electronic circuit boards or any other suitable device).

Of course, the filling circuit 4 may comprise other elements and notably other valve(s) upstream or downstream of the downstream isolation valve 6 and/or a buffer volume between the flow meter 9 and the downstream isolation valve 6 or any other suitable element.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for measuring a quantity of gas introduced into a gas tank via a filling station that has a filling pipe comprising an upstream end connected to at least one source of pressurized gas and a downstream end connected to the gas tank that is to be filled, the filling pipe comprising a flow meter and a downstream isolation valve positioned between the flow meter and the downstream end of the filling pipe, said method comprising the steps of:
   transferring gas from the source to the tank, during which step the downstream isolation valve is open;
   interrupting the transfer of gas with closure of the downstream isolation valve;
   measuring, using the flow meter, a quantity of gas transferred during said step of transferring, including a measurement of a quantity of gas situated downstream of the flow meter in the filling pipe prior to said step of transferring and a measurement of a quantity of gas situated downstream of the flow meter in the filling pipe during and/or at the end of said step of transferring;
   optionally, calculating a quantity of gas situated downstream of the flow meter in the filling pipe prior to said step of transferring and calculating a quantity of gas situated downstream of the flow meter in the filling pipe during and/or at the end of said step of transferring;
   obtaining a corrected quantity of gas transferred by adding a positive or negative determined corrective quantity to the transferred quantity of gas measured by the flow meter during said step of transferring;

generating a signal indicating the corrected quantity of gas transferred, the corrected quantity of gas transferred is obtained by adding a positive or negative determined corrective quantity to the transferred quantity of gas measured by the flow meter during said step of transferring; and displaying and/or making a charge for and/or transmitting data pertaining to the quantity of as introduced into the tank during the filling, wherein:

the determined corrective quantity is the difference between, on the one hand, the measured or calculated quantity of gas situated downstream of the flow meter in the filling pipe prior to said step of transferring, and on the other hand, the measured or calculated quantity of gas situated in the filling pipe downstream of the flow meter during and/or at the end of said step of transferring;

said step of generating is performed several times during the course of said step of transferring such that the difference between, on the one hand, the measured or calculated quantity of gas situated downstream of the flow meter in the filling pipe before said step of transferring, and on the other hand, the measured or calculated quantity of gas situated in the filling pipe downstream of the flow meter during filling, is calculated several times during the course of said step of transferring at successive moments in time, and in that the last-generated signal indicating the corrected quantity of gas transferred replaces the previous signal indicating the corrected quantity of gas transferred generated previously during the course of the same filling operation; and the most recent value for the quantity of gas transferred is taken into consideration when performing said step of displaying and/or making a charge for and/or transmitting data pertaining to the quantity of gas introduced into the tank during the filling by periodically or continuously updating the quantity of as introduced into the tank during the course of filling from variable values which are: i) the measured quantity of gas transferred as measured by the flow meter during the course of filling, and ii) the corrective quantity determined during the course of filling.

2. The method of claim 1, wherein:

said steps of optionally calculating a quantity of gas situated downstream of the flow meter in the filling pipe prior to said step of transferring, and calculating a quantity of gas situated downstream of the flow meter in the filling pipe during and/or at the end of said step of transferring, are performed;

the quantity of gas situated downstream of the flow meter in the filling pipe is calculated via a predetermined state equation applied to the gas, from a known volume of the filling pipe downstream of the flow meter, from a pressure measured in the filling pipe downstream of the flow meter, from a known molar mass or density of said gas, and from a measured or estimated temperature of the gas, the predetermined state equation being the perfect-gas equation or the real-gas equation.

3. The method of claim 2, wherein:

the volume of the filling pipe downstream of the flow meter is the sum of a first known volume (VA) of the filling pipe situated between the flow meter and the downstream isolation valve and of a second known volume (VB) of the filling pipe situated between the downstream isolation valve and the downstream end of the filling pipe;

the quantity of gas situated downstream of the flow meter in the filling pipe before or during/after said step of transferring is the sum of the quantities of gas in the first volume (VA) and the second (VB) volume;

the quantities of gas in the first (VA) and second (VB) volumes are calculated via the predetermined state equation applied to the first volume (VA) and to the second (VB) volume, respectively, from the pressures measured in the filling pipe and in said volumes (VA, VB), respectively, from the known molar mass or density of said gas, and from the measured or estimated temperature of the gas in said volumes (VA, VB), respectively, the predetermined state equation being the perfect-gas equation or the real-gas equation.

4. The method of claim 3, wherein the measured or calculated quantity of gas situated downstream of the flow meter in the filling pipe before said step of transferring is determined while the downstream isolation valve is closed and while the first volume (VA) is in fluidic communication with the source of pressurized gas and at the pressure of the pressurized-gas source.

5. The method of claim 3, wherein:

the filling pipe comprises a heat exchanger for cooling the gas situated between the flow meter and the downstream isolation valve, the first volume (VA) consisting of a first portion (VA1) situated between the flow meter and the inlet of the heat exchanger and a second portion situated between the heat exchanger and the downstream isolation valve; and the quantity of gas in the first volume (VA) is the sum of the quantities of gas in said portions (VA1, VA2), the volumes of which are known, wherein the respective pressures or temperatures of the gas in said portions are measured or estimated separately.

6. The method of claim 3, wherein the quantity of gas situated downstream of the flow meter in the filling pipe before said step of transferring is measured or calculated while the downstream isolation valve is closed and while the second volume (VB) is in fluidic communication with the tank that is to be filled and is at the pressure of the tank that is to be filled.

7. The method of claim 1, wherein:

the filling pipe comprises, downstream of the downstream isolation valve, a controlled purge valve configured to allow the purging of the filling pipe; and the measured or calculated quantities of gas downstream of the flow meter in the filling pipe before and after said step of transferring are determined while the controlled purge valve is closed and prior to a purge step, if any, that consists in opening the purge valve after the transfer step.

8. The method of claim 7, wherein the pressure measured in the filling pipe downstream of the flow meter is measured when the controlled purge valve is closed.

9. The method of claim 1, wherein said step of generating is performed during said step of transferring, either regularly, continuously or intermittently during the transfer step, and optionally at the end of said step of transferring or after the end of said step of transferring.

10. The method of claim 1, wherein the most recent value for the transferred quantity of gas is taken into consideration when displaying and/or making a charge for and/or transmitting data pertaining to the quantity of gas introduced into the tank during the filling, which means to say that the quantity of gas introduced into the tank is periodically or continuously updated during the course of filling from variable values which are the measured quantity of gas transferred, as measured by the flow meter during the course of filling, and the corrective quantity determined during the course of filling.

11. The method of claim 1, wherein the flow meter is of the type that generates electric signals in the form of successive pulses each corresponding to an elementary measured quantity of gas, and in that the generation of a signal indicating the corrected quantity of gas transferred is obtained by a step of modifying at least one of the following: the value of the elementary quantity of gas corresponding to a pulse generated by the flow meter and/or the number of pulses generated by the flow meter and/or the frequency with which the pulses generated by the flow meter are emitted and/or the number of pulses counted from the pulses generated by the flow meter.

12. The method of claim 1, wherein the filling station comprises an electronic data processing and storage device, notably comprising a microprocessor and/or a computer, said electronic device being configured to receive a signal indicative of the quantity of gas transferred as measured by the flow meter during said step of transferring and to calculate and/or receive and/or transmit and/or display the signal indicating the corrected quantity of gas transferred.

13. The method of claim 1, wherein the signal indicating the corrected quantity of gas transferred is used in a step of calculating a charge to be made for the quantity of gas introduced into the tank.

\* \* \* \* \*